UNITED STATES PATENT OFFICE.

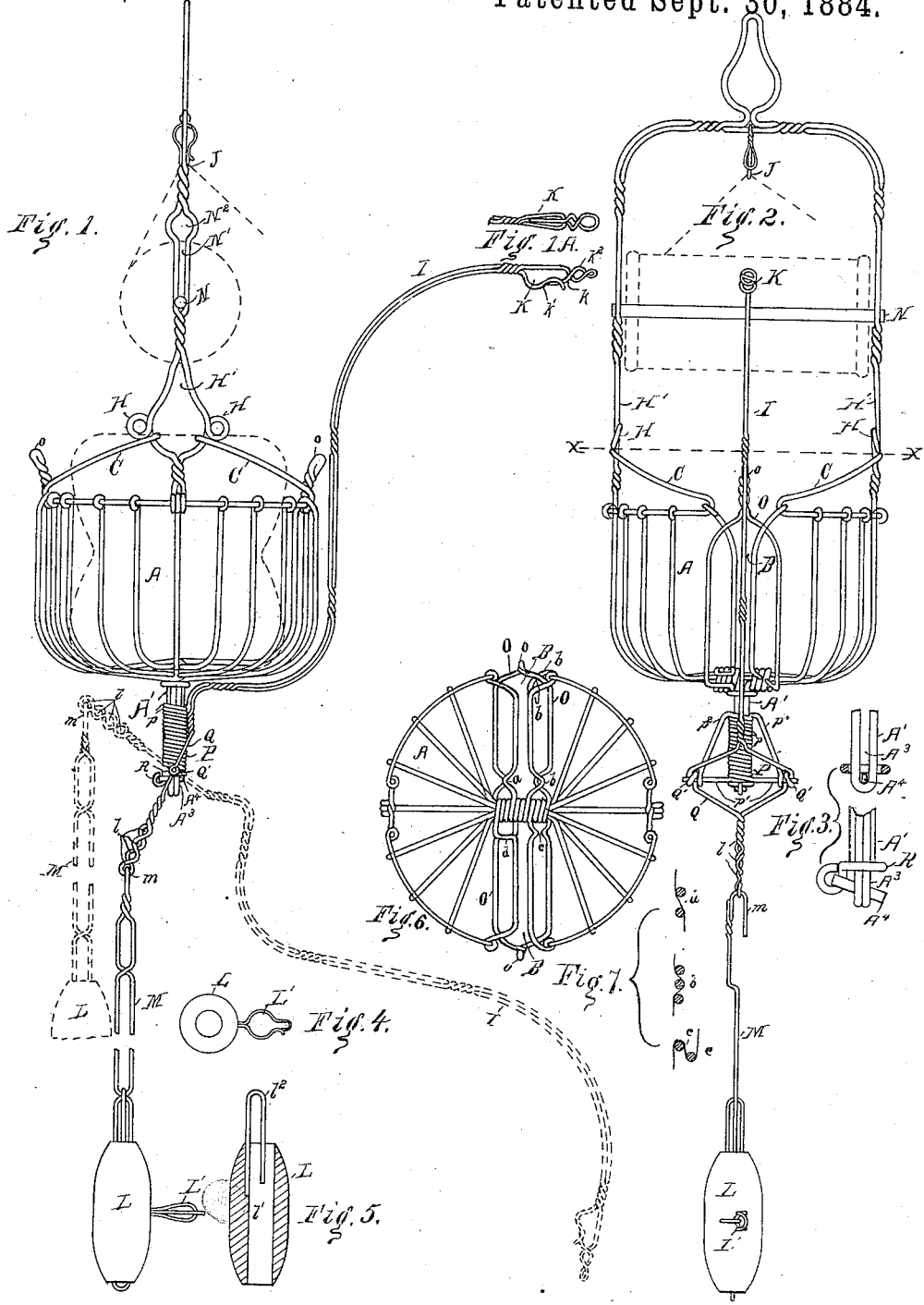

WISNER B. BISBEE, OF LOWELL, MASSACHUSETTS, ASSIGNOR TO FREDERICK TAYLOR, OF SAME PLACE.

TWINE-HOLDER.

SPECIFICATION forming part of Letters Patent No. 305,786, dated September 30, 1884.

Application filed March 7, 1884. (No model.)

*To all whom it may concern:*

Be it known that I, WISNER B. BISBEE, a citizen of the United States, residing in Lowell, in the county of Middlesex and Commonwealth of Massachusetts, have invented certain new and useful Improvements in Twine-Holders, of which the following is a specification.

My invention relates to means of creating a tension on the twine; to means of varying such tension; to means of guiding the twine to the tension devices or delivery-outlet of the basket; to means of pivoting the take-up lever to the basket beneath the same; to means of swiveling the take-up lever to the basket; to means of varying the distance of the take-up weight from the fulcrum of the take-up lever; to means of varying the distance of said weight from the short arm of said lever; also, to twine-eyes, attaching-eyes, and to the devices and combinations hereinafter described and claimed.

In the accompanying drawings, Figure 1 is a side elevation of a twine-holder provided with my improvement, a spool of twine, also a ball of twine, being shown by dotted lines, the position of the take-up lever when the same is drawn down by pulling on the twine being also shown by dotted lines; Fig. 1ᴬ, a top view of the upper end of said lever; Fig. 2, a front elevation of said twine-holder, a spool of twine being shown in dotted lines; Fig. 3, in its lower part a side view of the lower stem, and in its upper part a vertical cross-section of the same; Fig. 4, a top view of the take-up weight; Fig. 5, a vertical central section of the same; Fig. 6, a plan of that part of the basket or holder proper below the line X X in Fig. 2; Fig. 7, cross-sections of the tension-wires at the point where the twine is drawn between them.

A is the basket or twine-holder proper, similar to that shown in United States Patent No. 282,696, granted August 7, 1883, to myself and another, for twine-holder, except as hereinafter described. The basket is divided vertically by slots B into halves, united at the center somewhat as in said patent; but the particular method of uniting the side wires to each other at the center of the basket is described and claimed in another application filed herewith. There is a twine-guide, O, in each slot B, which overlaps the sides of said slot, as shown, and is provided on top with a horn or projection, $o$, and from this projection the top of the guide is inclined downward to guide the twine into the slots, the top of the basket being also provided with inclines C, as shown in said patent. The side of one of the slots B is made double at $b$, so as both to overlap the guide and to be overlapped by it to increase the tension on the twine, as hereinafter described. The part of each guide near the center of the basket is provided on each side with a notch, if the basket be of sheet or cast metal, or, if made of wire, with a bend or offset, $a\ b\ c\ d$, the sides of the slots being also notched or offset to hold the twine down and cause it to be drawn from near the bottom of the basket. The overlapping edges of the guide O and the slots B serve as tension bars or edges, to create a tension upon the twine by deflecting or bending the twine from a straight course, as shown in Fig. 7, from which it is apparent that the edges or bars at $a$ bend the twine slightly out of its course, that the bars at $b$ bend the twine twice, and that the edges or bars at $c$ twice reverse the course of the twine. The twine passes freely through the opening at $d$ of the twine-holder, the offset in the wires being so great at $d$ that the twine is merely prevented from drawing out through the guide-slots.

The attaching-eyes H H are the same as the corresponding parts in said patent; but the basket may be suspended by hanging the slots over a screw-head or nail-head in a post or overhead floor-timber, this slot H' being made with an opening at the lower end large enough to admit the head of such screw or nail freely, and with sides converging above said opening to pinch the shank of the screw below the head. The take-up lever I, (which is used for the same purpose as the take-up lever described in said patent,) instead of being pivoted above the basket or holder proper, as shown in said patent, is supported below the same. The basket A is provided with a stud, A', which is secured to the center of the bottom of the basket and reaches vertically downward. A sleeve, P, preferably formed by laying two wires, $p\ p$, together and winding them around a cylindrical mandrel, turns freely on this stud, the lower ends of the two wires last named being bent out horizontally in opposite directions into arms $p'\ p'$, and the upper ends of the same wires are bent downward at an angle and bent around said arms to form braces $p^2\ p^2$ for said arms, and also to serve as stops for the bearings of the take-up lever. The take-up lever is provided with a yoke, Q, which has loops Q', adapted to receive the ends of said arms, on which arms said lever may turn freely. The stud A' is provided with a vertical slot, $A^3$, through which the pin $A^4$ is passed below the sleeve P, to hold the sleeve on the stud, and the pin $A^4$ is swiveled to a ring, R, so that the pin cannot be removed from the slot without lifting the ring and sleeve. The lever has thus a swiveling motion, so that the twine may be freely drawn from any direction below the basket. The long arm of the lever is so bent that when no strain is put upon the twine it will conform, through a portion of its length, to the shape of the basket, as shown in Fig. 1, and the outer end of said long arm is provided with an eye, K, through which the twine passes. This eye is a self-threading eye—that is, it can be threaded without putting the end of the twine through the eye—said eye consisting of a hook, $k$, and a loop, $k'$, so bent as to extend along each side of the point of said hook, the point of the hook $k$ being turned outward from its shank, so as to reach between the sides of the loop $k'$.

It is apparent that the twine, being laid between the hook and the loop, and drawn to the left in Fig. 1, will be drawn into the eye $k^2$, but cannot be drawn out except endwise. The doubled outer end of the hook is twisted, as shown, so that the twine may be drawn into the outer end of the lever and remain there. The shorter or lower end of the take-up lever is provided with eyes or holes $l$, in order that a weight, L, may be hooked into one of these eyes or holes nearer to or farther from the fulcrum, according as the twine is lighter or heavier.

To increase the capacity of the take-up, the weight is provided with a hook and guard or threading-eye, L', substantially like the one at the upper end of the take-up lever, except that the outer end of the hook is not twisted. Through this eye the twine is passed, as into the threading-eye above described. The weight is provided with a central opening, $l'$, and with a hook, $l^2$, within said opening, as shown, and is attached to the take-up lever, not directly, but by means of a connecting-rod, M, provided with a hook, $m$, at its upper end, and with a succession of eyes, any one of which may receive the hook of the take-up weight. The lower the weight is hung the greater will be the amount of twine taken up—that is, the nearer the eyes will approach each other when the lever is drawn down, and the farther they will be apart when the longer end of the lever is subsequently raised by the weight.

If desired, a spool of twine may be used instead of a ball of twine. If a spool be used, it is supported and turns upon a rod, N. This rod is provided with an annular groove near each end thereof, and the bail of the basket is provided on each side with a key-hole-shaped slot, N'—that is, a slot having straight parallel sides throughout the greater part of its length, but having at the upper end a circular enlargement, $N^2$, as shown, through which the rod may be freely passed into the spool. The grooves of the rod are then drawn down into the straight narrow part of the slot.

The twine from the spool is carried through a threading-eye, J, just like the threading-eye attached to the weight, and secured or suspended above the spool, in order that when two different twines are used in the same twine-holder the two twines may not get twisted together.

I claim as my invention—

1. The combination of the twine-holder or basket, provided with a slot extending from its open end to a point near its closed end, and a twine-guide overlapping the edges of said slot, the edges of said guide being notched, as and for the purpose specified.

2. The combination of the twine-holder or basket, provided with a slot extending from its open end to a point near its closed end, and a twine-guide overlapping the edges of said slot, the edges of said slot being notched, as and for the purpose specified.

3. The combination of the twine-holder or basket, provided with a slot extending from its open end to a point near its center, and a twine-guide overlapping the edges of said slot, said guide and the edges of said slot being provided with notches of different depths, as and for the purpose specified.

4. The combination of the twine-holder or basket, provided with a slot extending from its open end to a point near its center, and a twine-guide having a projecting inclined top, and overlapping the edges of said slot, as and for the purpose specified.

5. The combination of the twine-holder and the take-up lever, and means of pivoting the same to said holder beneath the same, as and for the purpose specified.

6. The combination of the twine-holder and the take-up lever swiveled to said holder, as and for the purpose specified.

7. The combination of the twine-holder provided with a stud, the sleeve provided with arms, the lever provided with bearing-eyes, and means for holding said sleeve upon said stud, as and for the purpose specified.

8. The combination of the holder or basket provided with a stud, slotted as described, the sleeve, the take-up lever pivoted thereto, and the ring, and the pin hinged to said ring, as and for the purpose specified.

9. The combination of the take-up lever, its shorter arm provided with holes at differing distances from the fulcrum of said lever, and the weight, and means of engaging said weight with either of said holes, as and for the purpose specified.

10. The combination of the basket, the take-up lever pivoted thereto, the weight provided with a twine-eye, and means of varying the distance of said weight from the short arm of said lever, as and for the purpose specified.

11. The combination of the basket, the take-up lever pivoted thereto, the connecting-rod provided with a hook and with a series of eyes, and the weight provided with a hook and with a twine-eye, as and for the purpose specified.

12. A self-threading twine-eye consisting of a hook and a loop or guard secured to the shank of said hook, and bent along the point of said hook on each side thereof, as and for the purpose specified.

13. A self-threading twine-eye consisting of a hook having its outer bend formed into a spiral, as and for the purpose specified.

14. A self-threading twine-eye consisting of a hook having its outer bend formed into a spiral, as described, and having a looped guard attached to the shank of said hook, and bent along the point of said hook on each side thereof, as and for the purpose specified.

15. The basket provided with an attaching-eye having a large opening at one end, and having sides which converge from said opening, as and for the purpose specified.

16. The twine-holder, its bail provided with opposite slots enlarged at their upper ends, and below that having parallel sides, in combination with the rod provided with annular grooves, as and for the purpose specified.

WISNER B. BISBEE.

Witnesses:
 E. W. THOMPSON,
 ALBERT M. MOORE.